(12) United States Patent
Delia et al.

(10) Patent No.: US 12,736,175 B2
(45) Date of Patent: Sep. 15, 2026

(54) ADJUSTMENT ASSEMBLY FOR DISPLAY UNIT

(71) Applicant: Lockheed Martin Corporation, Bethesda, MD (US)

(72) Inventors: Michael P. Delia, Orlando, FL (US); Denis Allemant Andre, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 169 days.

(21) Appl. No.: 18/680,961

(22) Filed: May 31, 2024

(65) Prior Publication Data

US 2025/0369562 A1 Dec. 4, 2025

(51) Int. Cl.
*F16M 13/02* (2006.01)
*F16M 11/12* (2006.01)

(52) U.S. Cl.
CPC .......... *F16M 13/022* (2013.01); *F16M 11/12* (2013.01)

(58) Field of Classification Search
CPC ................................................ F16M 11/12–14
USPC ................ 361/679.06, 679.07; 248/919–923
See application file for complete search history.

(56) References Cited

U.S. PATENT DOCUMENTS 2,922,609 A * 1/1960 Collier ................ F16M 11/126 396/428
3,011,529 A * 12/1961 Copp ..................... B27B 5/243 83/477.1
3,321,165 A * 5/1967 Wann ....................... H04N 5/64 108/146
3,486,629 A * 12/1969 Slaga ..................... A47F 5/025 211/1.51
3,789,140 A * 1/1974 McQueen ............. H04N 5/655 353/74
3,968,949 A * 7/1976 Romano, Jr. ........ G03B 21/145 248/397
3,974,994 A * 8/1976 Petterson ............... F16F 15/02 248/921

(Continued)

FOREIGN PATENT DOCUMENTS

CN 120274185 A * 7/2025 ............ F16M 11/18
WO WO-2005/036373 A1 4/2005

OTHER PUBLICATIONS

"Screw Jack Platform", LiftingMotion by Noudun, https://www.jack-actuator.com/screw-jack/screw-jack-platform/ (Jan. 18, 2021).*

(Continued)

*Primary Examiner* — Adrian S Wilson
(74) *Attorney, Agent, or Firm* — Foley & Lardner LLP

(57) ABSTRACT

An adjustment assembly for a display unit includes a first coupling plate, a second coupling plate, and a hinge. The first coupling plate is coupled with a support structure. The second coupling plate is coupled with the display unit. The hinge rotatably couples the first coupling plate with the second coupling plate such that the second coupling plate is configured to rotate about a first axis to adjust an orientation of the display unit in a first direction. The second coupling plate is coupled with a hinge member of the hinge such that the second coupling plate is configured to rotate about a second axis to adjust an orientation of the display unit in a second direction, the second axis perpendicular to the first axis.

20 Claims, 8 Drawing Sheets

(56) References Cited

U.S. PATENT DOCUMENTS 4,040,585 A * 8/1977 Socas ..................... A47B 37/02 248/676
4,068,961 A * 1/1978 Ebner ................. F16C 11/0661 248/921
4,145,021 A * 3/1979 Gaechter ................ F16M 11/18 248/455
4,318,522 A * 3/1982 Appleberry .............. B23Q 1/54 248/661
4,354,654 A * 10/1982 Werner .................. F16M 11/14 248/371
4,640,485 A * 2/1987 Day ....................... F16M 11/18 248/920
4,691,886 A * 9/1987 Wendling ............... F16M 11/10 248/920
4,934,647 A * 6/1990 Edwards ............ F16M 11/2021 248/346.06
4,936,513 A * 6/1990 Smith ..................... B02C 17/16 241/177
5,054,725 A * 10/1991 Bucefari .............. F16M 11/126 352/243
5,078,021 A * 1/1992 Freywiss ................ B25J 19/063 74/411
5,112,012 A * 5/1992 Yuan .................... F16M 11/125 74/89.41
5,124,805 A * 6/1992 Chung ............... F16M 11/2014 348/825
RE34,120 E * 11/1992 Plahn ...................... B60R 11/02 403/90
5,335,142 A * 8/1994 Anderson ............ G06F 1/1681 361/679.55
5,531,663 A * 7/1996 Gloyd .................... A61G 11/00 5/11
5,568,993 A * 10/1996 Potzick .............. F16M 11/2042 403/217
5,687,939 A * 11/1997 Moscovitch ........... F16M 11/24 361/679.04
6,095,476 A * 8/2000 Mathis ................... F16M 11/10 248/371
6,102,355 A * 8/2000 Rood .................... G06F 1/1601 248/920
6,334,599 B1 * 1/2002 Jeong ..................... F16M 11/08 248/346.06
6,510,049 B2 * 1/2003 Rosen .................. F16M 13/027 D14/336
6,655,645 B1 * 12/2003 Lu ...................... F16M 11/2014 248/176.1
7,152,836 B2 * 12/2006 Pfister ................... F16C 11/103 248/920
7,178,775 B2 * 2/2007 Pfister .................... F16M 11/10 248/920
8,454,174 B2 * 6/2013 Nakano .................. G03B 21/14 248/176.1
8,596,892 B2 * 12/2013 Murrow ............... F16M 11/041 396/428
9,042,090 B2 * 5/2015 Lu ........................ F16M 11/105 211/26
9,155,235 B2 * 10/2015 Lindblad ............... G06F 1/1601
9,422,971 B2 8/2016 Tran et al.
10,178,209 B1 * 1/2019 Hesse .................... H04N 23/54
11,000,125 B2 5/2021 Patrick et al.
11,145,228 B1 10/2021 Seeliger et al.
11,761,573 B2 * 9/2023 Laurent ................... G06F 1/166 361/679.22
2002/0168189 A1 11/2002 Mulcahy
2004/0011938 A1 * 1/2004 Oddsen, Jr. ........ F16M 11/2071 248/157
2004/0110570 A1 * 6/2004 Hutchon ............ A63B 69/3661 473/161
2006/0000957 A1 * 1/2006 Carnevali .......... F16M 11/2078 248/181.1
2007/0247795 A1 * 10/2007 Tseng ................... F16M 11/046 361/679.07
2008/0013264 A1 * 1/2008 Ido ......................... B60K 35/53 361/679.06
2008/0158801 A1 * 7/2008 Mathews ............... F16M 11/18 361/679.07
2009/0159768 A1 * 6/2009 Oh ......................... F16M 13/02 248/284.1
2009/0237873 A1 * 9/2009 Flessas ................. G06F 1/1601 361/679.01
2010/0243851 A1 * 9/2010 Murrow ................. F16M 11/16 248/372.1
2012/0168391 A1 7/2012 Liu
2013/0200240 A1 * 8/2013 Lindblad .............. F16M 13/022 248/372.1
2014/0160658 A1 * 6/2014 Wang ..................... F16M 11/18 361/679.22
2014/0321903 A1 * 10/2014 Tran ....................... F16M 11/18 403/113
2015/0009647 A1 * 1/2015 Lu .......................... F16M 13/02 211/26
2015/0202104 A1 * 7/2015 Edavana .............. A61G 11/008 600/22
2015/0267422 A1 * 9/2015 Tan ....................... E04G 19/003 249/188
2016/0360096 A1 * 12/2016 Holmes ................ F16M 11/205
2017/0023177 A1 * 1/2017 Yomogita ............ F16M 13/022
2020/0326032 A1 * 10/2020 Kaufmann ............. F16M 13/02
2022/0290797 A1 * 9/2022 Laurent ................ F16M 11/041

OTHER PUBLICATIONS

International Search Report & Written Opinion on International Patent Application No. PCT/US2025/029180 dated Sep. 10, 2025 (16 pages).

* cited by examiner 10
12
14
16
18
30
100
102

ADJUSTMENT ASSEMBLY FOR DISPLAY UNIT

FIELD

The present application relates generally to structural assemblies for display units.

BACKGROUND

Display units may be mounted to structures to provide a surround display system. During maintenance, the display units may be oriented and re-oriented such that different portions of the display units can be accessed.

SUMMARY

One implementation of the present disclosure relates to an adjustment assembly for a display unit, according to some embodiments. In some embodiments, the adjustment assembly includes a first coupling plate, a second coupling plate, and a hinge. In some embodiments, the first coupling plate is coupled with a support structure. In some embodiments, the second coupling plate is coupled with the display unit. In some embodiments, the hinge rotatably couples the first coupling plate with the second coupling plate such that the second coupling plate is configured to rotate about a first axis to adjust an orientation of the display unit in a first direction. In some embodiments, the second coupling plate is coupled with a hinge member of the hinge such that the second coupling plate is configured to rotate about a second axis to adjust an orientation of the display unit in a second direction, the second axis perpendicular to the first axis.

In some embodiments, the adjustment assembly further includes a drive apparatus. In some embodiments, the drive apparatus is coupled with both the first coupling plate and the second coupling plate. In some embodiments, the drive apparatus is configured to receive an input and cause a shaft to extend or retract to drive rotation of the second coupling plate about the first axis. In some embodiments, the drive apparatus includes a jack configured to receive the input as a manual torque input and drive extension of the shaft to cause the second coupling plate to rotate about the first axis.

In some embodiments, the hinge member is a second hinge member. In some embodiments, the hinge further includes a first hinge member. In some embodiments, the second hinge member is fixedly coupled with the second coupling plate and the first hinge member is fixedly coupled with the first coupling plate. In some embodiments, the first hinge member and the second hinge member are pivotally coupled with each other at the first axis.

In some embodiments, the adjustment assembly includes an alignment pin that is threadingly coupled with the first hinge member. In some embodiments, an end of the alignment pin is configured to engage a portion of the second hinge member. In some embodiments, the alignment pin is adjustable to set a position of the second hinge member relative to the first hinge member about the first axis.

In some embodiments, the second coupling plate is transitionable between multiple angular positions about the second axis. In some embodiments, the second coupling plate is coupled with the hinge member through a bearing. In some embodiments, the second coupling plate includes a pin. In some embodiments, the pin is configured to be received within an opening of the second coupling plate and corresponding openings of the hinge member to lock the second coupling plate at the different angular positions about the second axis.

In some embodiments, the display unit is configured to be adjusted about the first axis across a span of 90 degrees and about the second axis across a span of 90 degrees. In some embodiments, the adjustment assembly is capable of supporting a display unit having a weight over 200 pounds.

Another implementation of the present disclosure is a display system, according to some embodiments. In some embodiments, the display system includes a truss structure, a display unit, and an adjustment assembly for the display unit. In some embodiments, the adjustment assembly includes a first coupling plate, a second coupling plate, and a hinge. In some embodiments, the first coupling plate is coupled with the truss structure. In some embodiments, the second coupling plate is coupled with the display unit. In some embodiments, the hinge rotatably couples the first coupling plate with the second coupling plate such that the second coupling plate is configured to rotate about a first axis to adjust an orientation of the display unit in a first direction. In some embodiments, the second coupling plate is rotatably coupled with a hinge member of the hinge such that the second coupling plate is configured to rotate about a second axis to adjust an orientation of the display unit in a second direction. In some embodiments, the second axis is perpendicular to the first axis.

In some embodiments, the adjustment assembly further includes a drive apparatus. In some embodiments, the drive apparatus is coupled with both the first coupling plate and the second coupling plate. In some embodiments, the drive apparatus is configured to receive an input and cause a shaft to extend or retract to drive rotation of the second coupling plate about the first axis.

In some embodiments, the drive apparatus is a jack configured to receive the input as a manual torque input and drive extension of the shaft to cause the second coupling plate to rotate about the first axis. In some embodiments, the hinge member is a second hinge member and the hinge further includes a first hinge member. In some embodiments, the second hinge member is fixedly coupled with the second coupling plate and the first hinge member is fixedly coupled with the first coupling plate. In some embodiments, the first hinge member and the second hinge member are pivotally coupled with each other at the first axis.

In some embodiments, the adjustment assembly includes an alignment pin that is threadingly coupled with the first hinge member. In some embodiments, an end of the alignment pin is configured to engage a portion of the second hinge member. In some embodiments, the alignment pin is adjustable to set a position of the second hinge member relative to the first hinge member about the first axis.

In some embodiments, the second coupling plate is transitionable between multiple angular positions about the second axis. In some embodiments, the second coupling plate is rotatably coupled with the hinge member through a bearing. In some embodiments, the second coupling plate include a pin. In some embodiments, the pin is configured to be received within an opening of the second coupling plate and corresponding openings of the hinge member to lock the second coupling plate at the multiple angular positions about the second axis.

In some embodiments, the display unit is configured to be adjusted about the first axis across a span of about 90 degrees and about the second axis across a span of about 90 degrees. In some embodiments, the adjustment assembly is configured to support a display unit having a weight of about 150-250 pounds, e.g., about 220 pounds.

Another implementation of the present disclosure is a structural assembly, according to some embodiments. In some embodiments, the structural assembly includes a first coupling plate, a second coupling plate, a hinge, and a screw jack. In some embodiments, the first coupling plate is fixed to a truss structure. In some embodiments, the second coupling plate is coupled with a display unit. In some embodiments, the hinge includes a first hinge member coupled with the first coupling plate and a second hinge member coupled with the second coupling plate. In some embodiments, the hinge defines a first axis about which the second coupling plate and the second hinge member are rotatable to re-orient the display unit about the first axis. In some embodiments, the screw jack is coupled with the first coupling plate and the second coupling plate. In some embodiments, the screw jack is configured to receive a user input and drive rotation of the second coupling plate and the second hinge member about the first axis. In some embodiments, the second coupling plate is rotatably coupled with the second hinge member through a bearing such that the second coupling plate is configured to rotate relative to the second hinge member about a second axis. In some embodiments, the second axis is normal to the second hinge member and perpendicular with the first axis.

In some embodiments, the second coupling plate is transitionable between multiple angular positions about the second axis. In some embodiments, the second coupling plate includes a pin. In some embodiments, the pin is configured to be received within an opening of the second coupling plate and corresponding openings of the second hinge member to lock the second coupling plate at the angular positions about the second axis.

In some embodiments, the structural assembly includes an alignment pin that is threadingly coupled with the first hinge member. In some embodiments, an end of the alignment pin is configured to engage a portion of the second hinge member. In some embodiments, the alignment pin is adjustable to set a position of the second hinge member relative to the first hinge member about the first axis.

In some embodiments, the second coupling plate includes a lever. In some embodiments, the lever is configured to be grasped by a user to facilitate rotation of the second coupling plate about the second axis relative to the second hinge member.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

It will be recognized that the Figures are schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, methods, apparatuses, and for providing a corner adjustment assembly for a display unit. The various concepts introduced above and discussed in greater detail below may be implemented in any of a number of ways, as the described concepts are not limited to any particular manner of implementation. Examples of specific implementations and applications are provided primarily for illustrative purposes.

Display Assembly

Figure 1:
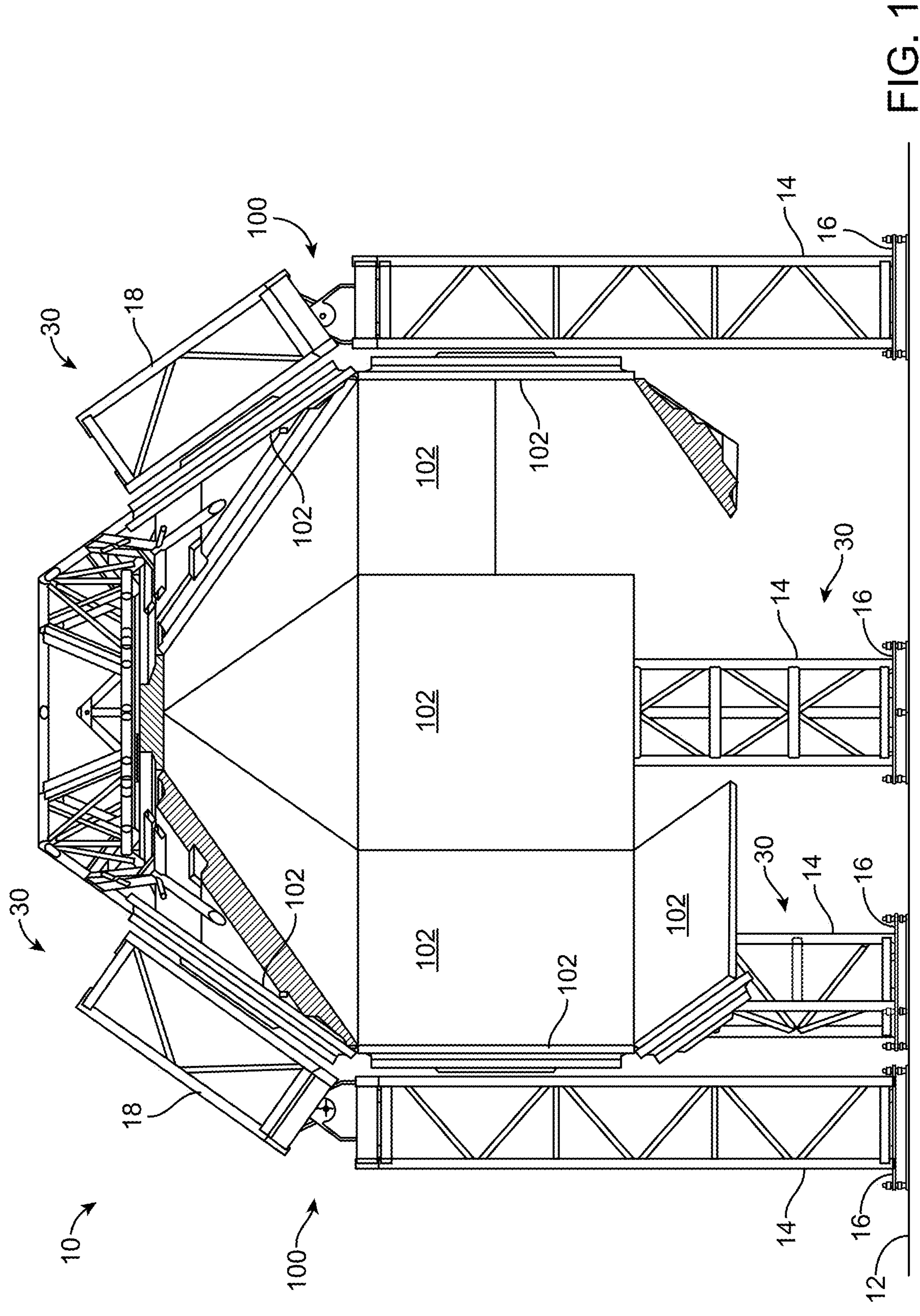
FIG. 1 is a diagram of a display system including multiple truss structures, corner assemblies, and display units, according to an exemplary embodiment.
Figure 2:
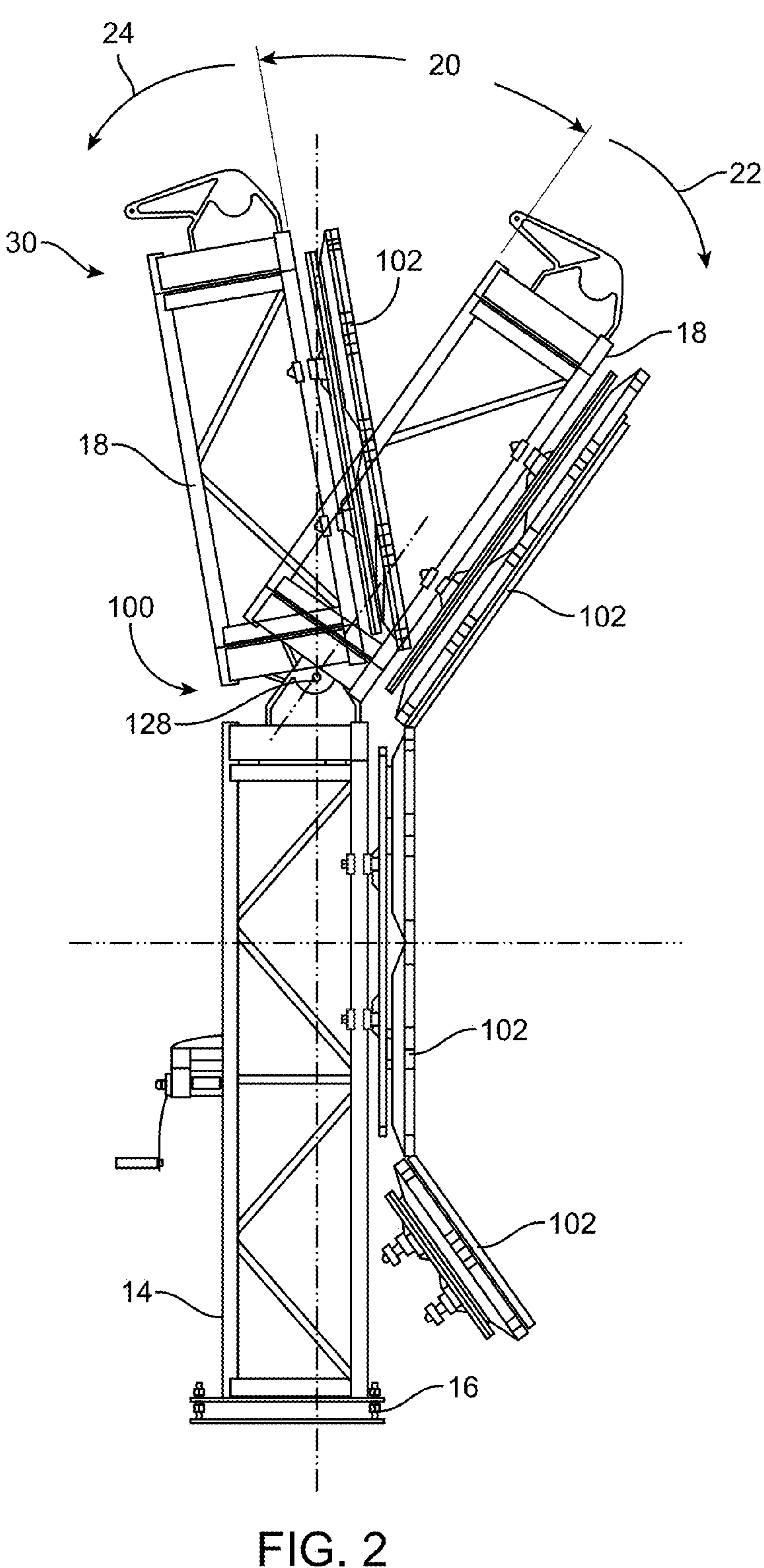
FIG. 2 is a side view of a column of the display system of FIG. 1, according to an exemplary embodiment.

Referring to FIGS. 1-2, a display assembly 10 for a display system includes multiple truss structures 14 (e.g., structural assemblies, bars, beams, cantilevered beams, support structures, etc.) anchored to a ground surface 12. The truss structures 14 may be anchored via ground anchors 16 that couple the truss structures 14 with the ground surface 12. The truss structures 14 extend vertically from the ground surface 12 and support multiple display units 102 (e.g., display screens, arrays of light emitting diodes, lighting assemblies, projectors, display interfaces, touch screen displays, etc.). The display units 102 are coupled with the truss structures 14 and oriented in a variety of directions to provide a wrap-around display assembly. The display assembly 10 may provide the display units 102 for flight simulation training or other seamless wrap-around visual display systems.

The display assembly 10 also includes corner assemblies 100 (e.g., adjustment assemblies, structural assemblies, adjustable corner units, rotatable corner units, repositionable corner assemblies, etc.) that are coupled on top of the truss structures 14 at a first connection point of the corner assemblies 100. The corner assemblies 100 are coupled with upper truss structures 18 at a second connection point opposite the first connection point. The upper truss structures 18 are coupled with corresponding display units 102 that are angled inwards to provide display of imagery in an upper location of the display assembly 10. The display units 102 may form a dome to provide surround visual imagery. The corner assemblies 100 are configured to both structurally support the display units 102 and orient the display units 102 in multiple directions. When the display units 102 require service or adjustment to orient the display units 102 into proper alignment, the corner assemblies 100 may be adjusted to allow access to portions of the display units 102 for maintenance or to properly align the display units 102 relative to each other. The truss structures 14, corner assemblies 100, and upper truss structures 18 may form columns 30 that are disposed in a pattern on the ground surface 12 (e.g., a polygonal arrangement, such as an octagonal arrangement). In order to orient the display units 102 that are coupled with the upper truss structures 18 properly, the corner assemblies 100 may be configured to re-orient the display units 102 and upper truss structures 18 in multiple directions (e.g., about a first axis and a second axis).

Figure 3:
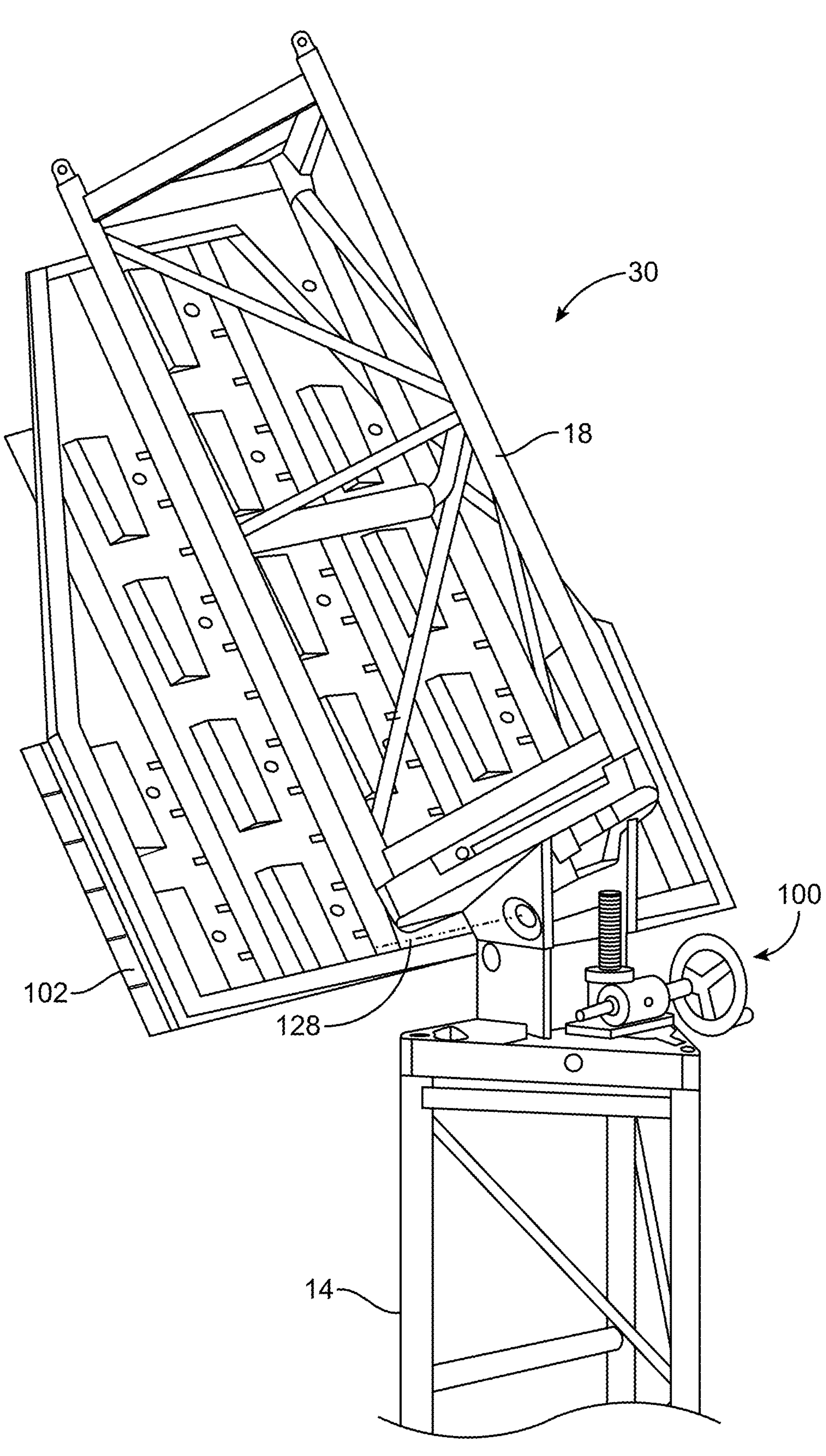
FIG. 3 is a rear perspective view of one of the columns of the display system of FIG. 1 with the corner assembly in a first position about a first axis, according to an exemplary embodiment.
Figure 4:
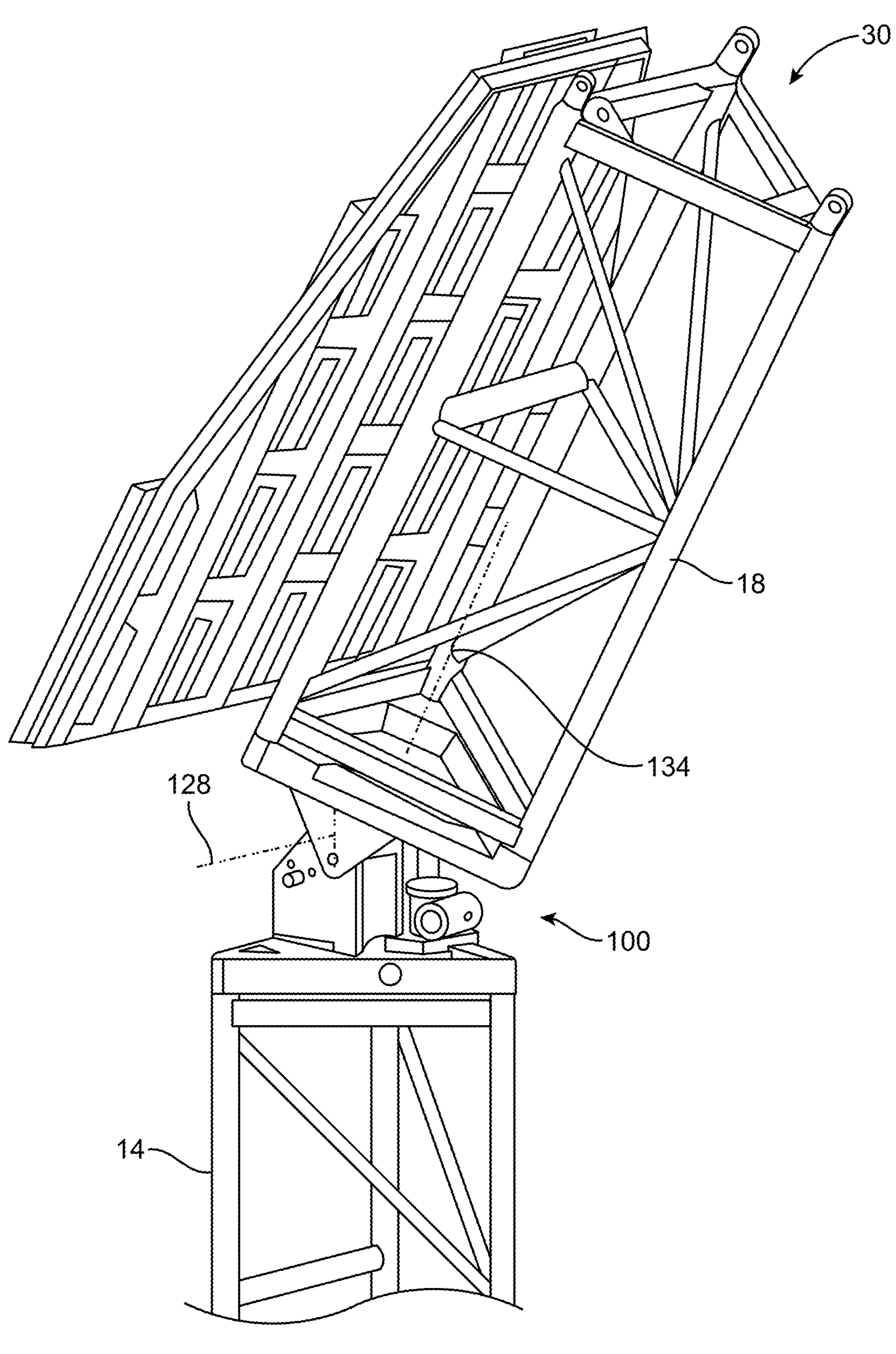
FIG. 4 is another rear perspective view of the column of FIG. 3 with the corner assembly in a second position about the first axis, according to an exemplary embodiment.

Referring particularly to FIGS. 2-4, the corner assemblies 100 are configured to re-orient the upper truss structures 18 and the display units 102 about a horizontal axis, shown as first axis 128. The display units 102 and the truss structures 18 may be driven to rotate about the first axis 128 by operation of the corner assemblies 100. In some embodiments, rotation of the upper truss structures 18 and the display unit 102 about the first axis 128 facilitates rotating the display unit 102 into a position such that a rear of the display unit 102 can be accessed by technicians for maintenance operations. The display unit 102 and the upper truss structures 18 may be driven to rotate about the first axis 128 in either of a first direction 22 (e.g., such that the display unit 102 is oriented downwards, towards the ground surface 12) and a second direction 24 (e.g., such that the display unit 102 is oriented upwards, away from the ground surface 12). In some embodiments, the display unit 102 and the upper truss structure 18 can be driven an angular range 20 (e.g., a span) up to 90 degrees. For example, from a neutral or vertical position where the upper truss structure 18 aligned with the truss structure 14 of the column 30, the display unit 102 and the upper truss structure 18 may be configured to rotate 60 degrees in the first direction 22 and 30 degrees in the second direction 24.

Figure 5:
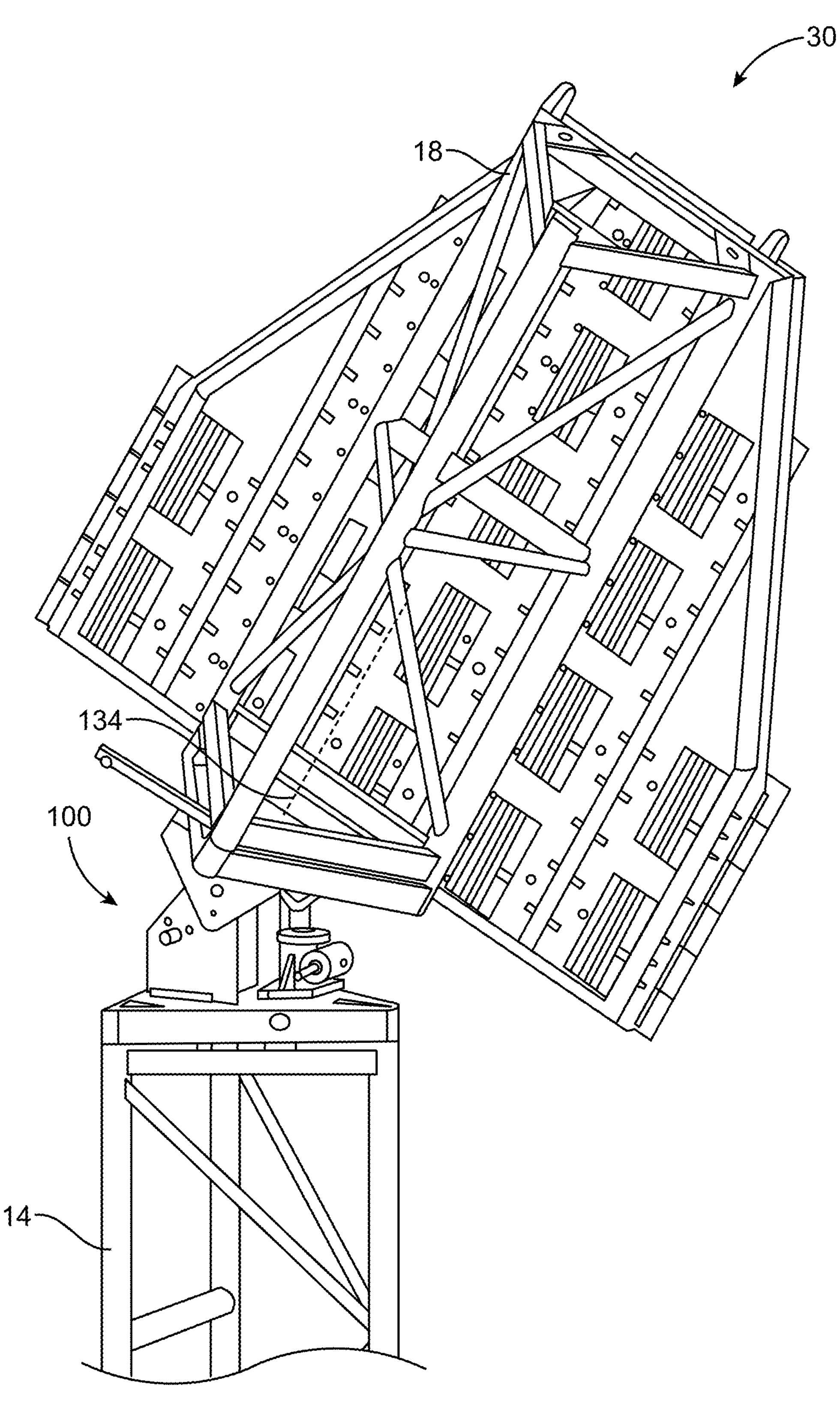
FIG. 5 is another rear perspective view of the column of FIG. 3 with the corner assembly in a second position about a second axis, according to an exemplary embodiment.

Referring to FIGS. 4 and 5, the upper truss structure and the display unit 102 may be further configured to rotate about a vertical axis, shown as second axis 134. The second axis 134 is perpendicular to the first axis 128, according to some embodiments. In some embodiments, the display unit 102 and the upper truss structure 18 are configured to be rotated 90 degrees in either direction about the second axis 134. Rotating the display unit 102 and the upper trust structure 18 about the second axis 134 may be performed to improve access to a rear of the display unit 102 for maintenance (e.g., to change light emitting diodes ("LEDs")) or to properly align the display unit 102 with neighboring display units 102.

Corner Adjustment Assembly

Figure 6:
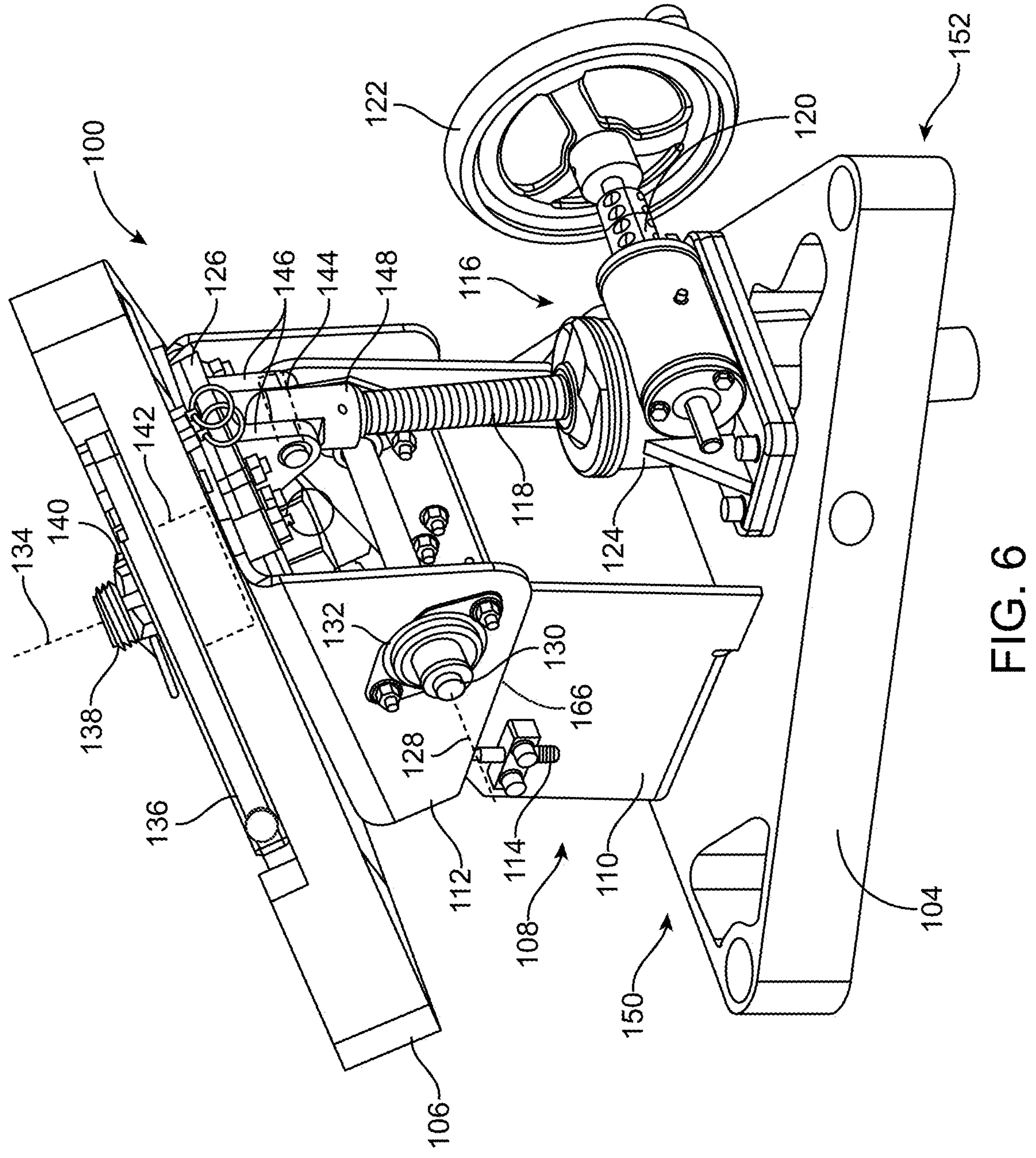
FIG. 6 is a perspective view of a corner assembly of the display system of FIG. 1 including a first coupling plate, a second coupling plate, and a hinge, according to an exemplary embodiment.

Referring to FIG. 6, the corner assembly 100 is shown in greater detail, according to some embodiments. The corner assembly 100 is configured to facilitate re-orientation (e.g., rotation) of the display unit 102 about the first axis 128 and the second axis 134. The corner assembly 100 includes a first coupling plate 104 (e.g., a first plate, a first coupler, a first structural member, etc.) and a second coupling plate 106 (e.g., a second plate, a second coupler, a second structural member, etc.). The corner assembly 100 also includes a hinge 108 (e.g., a hinge assembly, a hinge member, a hinge apparatus, etc.), a bearing 142 (e.g., a ball bearing, a roller bearing, a linear bearing, etc.), and a fastener 138. The first coupling plate 104 and the second coupling plate 106 are rotatably coupled with each other about the hinge 108. The hinge 108 defines the first axis 128 at a pin 130 that pivotally couples a first hinge member 110 with a second hinge member 112 of the hinge 108. The first hinge member 110 is fixed (e.g., welded, fastened, anchored, etc.) with the first coupling plate 104, according to some embodiments. In some embodiments, the second hinge member 112 is fixed with the second coupling plate 106 (e.g., welded, fastened, anchored, etc.).

The first coupling plate 104 and the second coupling plate 106 may have generally triangular shapes corresponding to shapes of the truss structure 14 and the upper truss structure 18. In some embodiments, the first coupling plate 104 and the second coupling plate 106 include openings, apertures, structure, etc., to facilitate coupling the first coupling plate 104 with the truss structure 14 and the second coupling plate 106 with the upper truss structure 18.

The hinge 108 includes the pin 130 that defines a pivot point of the hinge 108 (e.g., the first axis 128), according to some embodiments. The first hinge member 110 may include a pair of plates that are spaced apart from each other and are received within a corresponding pair of plates of the second hinge member 112. The pin 130 extends through both the first hinge member 110 and the second hinge member 112 and is coupled with the first hinge member 110 and the second hinge member 112 via bearings 132 to facilitate rotation of the second hinge member 112 relative to the first hinge member 110. The first hinge member 110 may be positioned at a front side 150 of the first coupling plate 104.

Referring still to FIG. 6, the corner assembly 100 includes a drive apparatus 116 (e.g., a drive member, a linear drive member, an extendable member, a screw jack, etc.). The drive apparatus 116 may be configured to receive a manual torque input and use the manual torque input to drive rotation of the second hinge member 112 (and therefore the second coupling plate 106 and the display unit 102) about the first axis 128. As shown in FIG. 6, the drive apparatus 116 is provided as a screw jack including a gear box 124 (e.g., a transfer case), a drive shaft 120 (e.g., an input shaft, a rotatable shaft, an input screw, etc.), a drive wheel 122 (e.g., an input device, a user interaction device, a lever, a handle, etc.), and a screw 118 (e.g., an output shaft, a linearly extending or retracting shaft, etc.). The screw 118 is coupled with a rear of the second hinge member 112, according to some embodiments. In some embodiments, the screw 118 includes an end 148 that is received within a pair of flanges 146 and is pinned via pin 144. The pair of flanges 146 extend from a plate 126 that is coupled (e.g., fastened) with the second hinge member 112, according to some embodiments. The drive apparatus 116 may be coupled (e.g., fastened) with the first coupling plate 104 at a back side 152 of the first coupling plate 104. In some embodiments, the drive apparatus 116 is an electric motor that can be electronically operated by a corresponding controller or processor. In some embodiments, the drive apparatus 116 is provided as a cable and winch system that can be adjusted to rotate the second hinge member 112 and the second coupling plate 106 about the first axis 128. The cable and winch system may include a cable that is coupled with the second coupling plate 106 and a handle and spool such that the cable can be wound onto the spool and let off the spool to adjust orientation of the second coupling plate 106 and the second hinge member 112 about the first axis 130. The handle and spool of the cable and winch system may be provided lower on the truss structure 14 such that the handle can be operated by a user standing on the ground surface 12.

The drive shaft 120 is driven to rotate by the drive wheel 122 (e.g., by manual operation by the user), according to some embodiments. The drive shaft 120 is configured to rotate about a corresponding axis that extends centrally through the drive shaft 120, and drive translation of the screw 118 along an axis different than the axis about which the drive shaft 120 is rotated. The gear box 124 may include a worm drive or other gearing arrangement to convert rotation of the drive shaft 120 into translational motion of the screw 118. Translation of the screw 118 causes the second hinge member 112 to rotate about the first axis 128 to rotate the display unit 102. In this regards, the display unit 102 (e.g., the second hinge member 112 and the second coupling plate 106) can be driven to rotate about the first axis 128 by operating (e.g., rotating) the drive wheel 122. The drive apparatus 116 may have a crank ratio sufficiently high such that adjustments to the orientation of the display unit 102 about the first axis 128 may be accomplished manually (by hand). For example, the crank ratio from input to output may be about 6:1.

Referring still to FIG. 6, the second coupling plate 106 is rotatably coupled with the second hinge member 112 through the fastener 138 and the bearing 142, according to some embodiments. The fastener 138 and the bearing 142 are co-axial with each other and define the second axis 134, according to some embodiments. The second coupling plate 106 is configured to rotate about the second axis 134 independently of rotation of the second hinge member 112 about the first axis 130 such that the second coupling plate 106 and the upper truss structure 18 and display unit 102 can be re-oriented about the second axis 134, according to some embodiments. For example, the second coupling plate 106 may be rotated about the second axis 134 without requiring corresponding rotation of the second hinge member 112 about the first axis 130. Likewise, the hinge member 112 may be driven to rotate about the first axis 130 without requiring rotation of the second coupling plate 106 about the second axis 134. The fastener 138 may be coupled with the second coupling plate 106 via a nut 140 (e.g., a cage nut).

Figure 7:
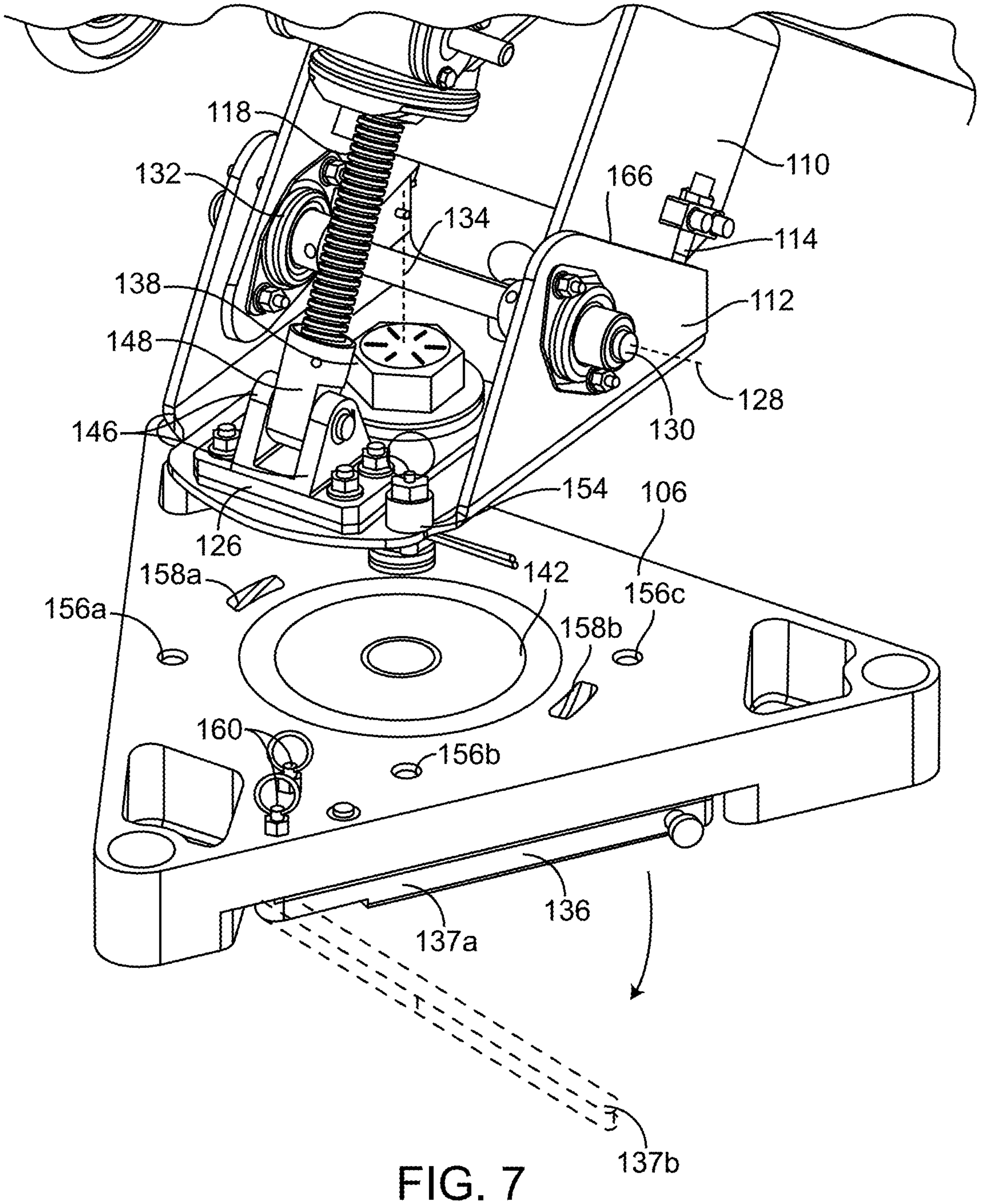
FIG. 7 is a perspective view of the second coupling plate of the corner assembly of FIG. 6, according to an exemplary embodiment.
Figure 8:
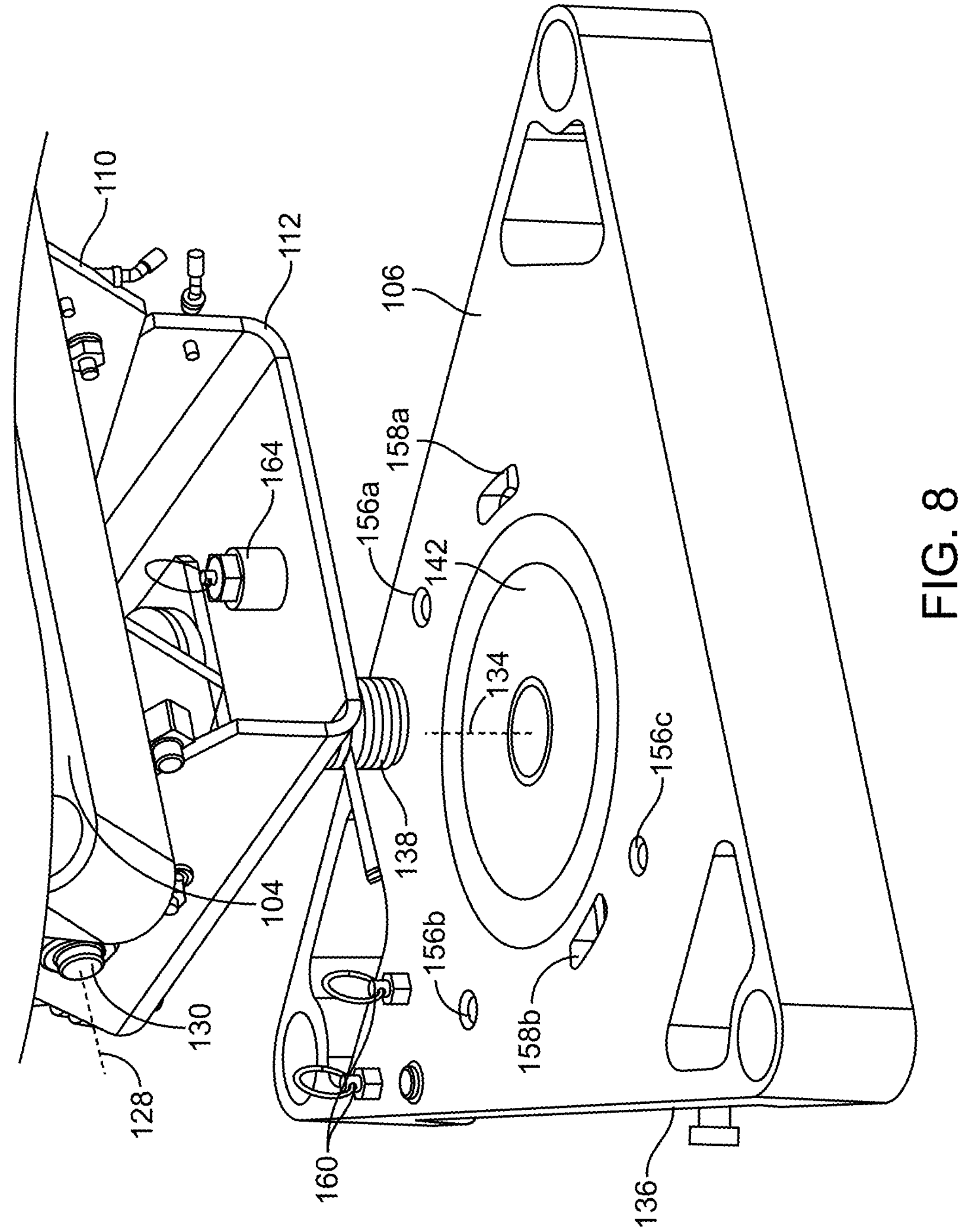
FIG. 8 is another perspective view of the second coupling plate of the corner assembly of FIG. 6, according to an exemplary embodiment.

Referring particularly to FIGS. 7 and 8, the bearing 142 is shown in greater detail, according to some embodiments. The bearing 142 may be a roller bearing, a needle bearing, etc., and is disposed within the second coupling plate 106. The bearing 142 can be positioned centrally on the second coupling plate 106. The bearing 142 includes a central opening through which the fastener 138 extends. The fastener 138 may extend through a corresponding opening of the second hinge member 112 to couple the second hinge member 112 with the second coupling plate 106.

Referring to FIGS. 6-8, the second coupling plate 106 includes a handle 136 (e.g., an arm, a crank arm, a lever, etc.). The handle 136 is retractable between a stowed position 137*a* and a deployed position 137*b*, according to some embodiments. In some embodiments, the handle 136 can be rotated between the stowed position 137*a* and the deployed position 137*b* and locked in the stowed position 137*a* or the deployed position 137*b*. When the handle 136 is in the stowed position 137*a*, the handle 136 may align with an edge or side of the second coupling plate 106. When the handle 136 is in the deployed position 137*b*, the handle 136 protrudes from the second coupling plate 106. The handle 136 may be rotatably or pivotally coupled with the second coupling plate 106 via a pin 162. The second coupling plate 106 also includes a pair of removable pins 160 that can be removed from corresponding openings in the second coupling plate 106 and re-inserted to lock the handle 136 in either the stowed position 137*a* or the deployed position 137*b*.

Referring to FIGS. 7-8, the second hinge member 112 also includes a locking pin 154. The locking pin 154 extends from a side of the second hinge member 112 opposite a side on which the second hinge member 112 couples with the second coupling plate 106. The locking pin 154 may be spring loaded and is positioned at a first radius relative to the second axis 134. In some embodiments, the locking pin 154 is configured to be received within one of multiple openings 156*a*-156*c* in the second coupling plate 106. As shown in FIGS. 7-8, the openings 156*a*-156*c* include a first opening 156*a*, a second opening 156*b*, and a third opening 156*c*. The first opening 156*a*, the second opening 156*b*, and the third opening 156*c* are positioned outwards from the second axis 134 at the first radius. The first opening 156*a*, the second opening 156*b*, and the third opening 156*c* define different positions for the second coupling plate 106 and the display unit 102 about the second axis 134. In some embodiments, the second opening 156*b* defines a normal or rest position in which an axis normal to a surface of the display unit 102 is perpendicular with a plane defined between the first axis 128 and the second axis 134 (e.g., the orientation as shown in FIGS. 3 and 4). The first opening 156*a* defines a right position in which the display unit 102 is oriented to face a right direction. The third opening 156*c* defines a left position in which the display unit 102 is oriented to face a left direction opposite the right direction. In this way, the display unit 102 and the second coupling plate 106 can be re-orientable about the second axis 134 in either direction, and can also be configured to be locked in multiple orientations.

In order to transition the display unit 102 and the second coupling plate 106 out of a current position or orientation about the second axis 134 and transition the coupling plate 106 into a different position or orientation about the second axis 134, the locking pin 154 may first be removed. The locking pin 154 can be pulled such that the locking pin 154 does not extend through a corresponding one of the openings 156*a*-156*c* (e.g., the second opening 156*b*). The second coupling plate 106 and the display unit 102 may be rotated in either direction about the second axis 134 until the locking pin 154 aligns with either the first opening 156*a* or the third opening 156*c*. The locking pin 154 may then be re-inserted through the second hinge member 112 into the corresponding first opening 156*a* or third opening 156*c* to lock the display unit 102 and the second coupling plate 106 in either the first or third position corresponding to the first opening 156*a* and the third opening 156*c*. In some embodiments, after the locking pin 154 is removed, the second coupling plate 106 and the display unit 102 may be rotated about the second axis 134 by transitioning the handle 136 into the deployed position and using the handle 136 to rotate the second coupling plate 106 and the display unit 102. In some embodiments, the locking pin 154 is spring loaded such that the locking pin 154 is automatically driven into engagement with the second coupling plate 106 when the locking pin 154 is aligned with one of the openings 156*a*-156*c*. The third opening 156*c* and the first opening 156*a* may be disposed 90 degrees from the second opening 156*b* in opposite directions about the second axis 134 at the first radius to provide three predetermined angular positions of the display unit 102 and the second coupling plate 106.

In some embodiments, the predetermined angular positions may correspond to alignment of the locking pin 154 with the openings 156*a*-156*c*. A first angular position (e.g., a normal position, a default position, etc.) is provided when the locking pin 154 is received within the second opening 156*b*, according to some embodiments. A second angular position (e.g., 90 degrees to the right) is provided when the locking pin 154 is received within the first opening 156*a*, according to some embodiments. A third angular position (e.g., 90 degrees to the left) is provided when the locking pin 154 is received within the third opening 156*c*, according to some embodiments. In some embodiments, more than three openings **156*a*-156*c* are provided such that the second coupling plate 106 and the display unit 102 can be locked in more than three predetermined angular positions. In some embodiments, the three openings 156*a*-156*c* are spaced other than 90 degrees (e.g., the first opening 156*a* and the third opening 156*c* may be disposed 30 degrees or 60 degrees relative to the second opening 156*b***).

Referring to FIGS. 7 and 8, the second hinge member 112 also includes a safety pin 164. The safety pin 164 is spring loaded such that the safety pin 164 maintains engagement with the second coupling plate 106 and automatically locks to prevent over-rotation of the second coupling plate 106, according to some embodiments. In some embodiments, the safety pin 164 is positioned at a second radius relative to the second axis 134 that is different than the first radius at which the locking pin 154 is positioned. The second coupling plate 106 includes a first groove **158*a* and a second groove 158*b* formed in a face of the second coupling plate 106 that faces the second hinge member 112. The first groove 158*a* and the second groove 158*b* are positioned outwards from the second axis 134 at the second radius. The first groove 158*a* and the second groove 158*b* have an arcuate shape corresponding to a circumference having the second radius. The first groove 158*a* and the second groove 158*b* have a variable depth and a descending surface that terminates at a lowest point at an end of the first groove 158*a* and the second groove 158*b*. The first groove 158*a* and the second groove 158*b* may be configured to limit further rotation of the second coupling plate 106 and the display unit 102 past the positions at which the locking pin 154 is aligned with the first opening 156*a* or the third opening 156*c***.

For example, when transitioning the display unit 102 and the second coupling plate 106 from a first position in which the locking pin 154 is received within the second opening **156*b* to a second or third position in which the locking pin 154 is received within the first opening 156*a* or the third opening 156*c*, the safety pin 164 may limit further rotation past the second or third position. For example, the safety pin 164 may be spring loaded such that the safety pin 164 maintains engagement with the second groove 158*b* (e.g., "walks along the second groove 158*b*) as the second coupling plate 106 is rotated in order to align the locking pin 154 with the first opening 156*a*. When the safety pin 164 has reached an end of the second groove 158*b* after walking along a surface of the second groove 158*b*, the safety pin 164 may abut a vertical surface of the second groove 158*b* to limit further rotation beyond the end of the second groove 158*b*. The safety pin 164 can therefore limit over-rotation of the second coupling plate 106 and the display unit 102 beyond 90 degrees in either direction. The safety pin 164 does not need to be pulled out of engagement with the first groove 158*a* or the second groove 158*b* to rotate the second coupling plate 106 back from the end of the first groove 158*a* or the second groove 158*b* due to the sloped shape of the first groove 158*a* and the second groove 158*b*. In this way, the safety pin 164, the first groove 158*a*, and the second groove 158*b* provide limits for over-rotation of the second coupling plate 106 and the display unit 102 while allowing back-rotation of the second coupling plate 106 and the display unit 102**.

Referring to FIGS. 6 and 7, the first hinge member 110 includes an alignment pin 114 (e.g., a set screw, a screw, etc.) that is threadingly coupled with a side of the first hinge member 110. The alignment pin 114 is coupled with a side of the first hinge member 110 and can be adjusted (e.g., rotated) to translate towards or away from a corresponding surface 166 of the second hinge member 112. The alignment pin 114 may be rotated into engagement with the corresponding surface 166 of the second hinge member 112 in order to mark a current position or orientation of the second hinge member 112 relative to the first hinge member 110. The alignment pin 114 may advantageously provide a marker of a desired angular position about the first axis 128 for the second hinge member 112 and the coupling plate 106. When the drive apparatus 116 is driven to rotate the second hinge member 112 and the second coupling plate 106 in a rearwards direction about the first axis 128 (e.g., such that the corresponding surface 166 is driven out of engagement with the alignment pin 114), the alignment pin 114 may mark a position about the first axis 128 such that, when maintenance is completed, the drive apparatus 116 can be operated to return the second hinge member 112 and the second coupling plate 106 to a previous angular position about the first axis 128. Advantageously, the alignment pin 114 can be used so that the second coupling plate 106 and the second hinge member 112 can be returned to a previous angular position about the first axis 128.

Referring again to FIGS. 1-8, the display units 220 may each have a weight of between about 150 pounds to about 250 pounds, e.g., over about 200 pounds (e.g., about 220 pounds). In some embodiments, the upper truss structure 18 may have a weight of between about 15 pounds to about 25 pounds, e.g., about 20 pounds. In some embodiments, the corner adjustment assembly 100 has a weight of about 75 pounds to about 100 pounds, e.g., 90 pounds. The weights above are provided as representative examples to which the claims are not limited. The upper truss structure 18 and the truss structures 14 may be manufactured from aluminum or other metals or combinations of metals. Advantageously, the corner assembly 100 provide robust adjustment assemblies that can support the display units 102 and the upper truss structures 18 and facilitate precise re-orientation of the display units 102 for alignment and/or maintenance operations.

Configuration of Example Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

When the language "a portion" is used, the item can include a portion and/or the entire item unless specifically stated to the contrary. Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations. Any numerical parameter should at least be construed in light of the number reported significant digits and by applying ordinary rounding techniques. The term "about" when used before a numerical designation, e.g., ratios, angles or dimensions for length, radius, width, etc., indicates approximations which may vary by (+) or (−) 10%, 5% or 1%.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

What is claimed is:

1. An adjustment assembly for a display unit, the adjustment assembly comprising:

a first coupling plate coupled with a support structure;

a second coupling plate coupled with the display unit;

a hinge rotatably coupling the first coupling plate with the second coupling plate such that the second coupling plate is configured to rotate about a first axis to adjust an orientation of the display unit in a first direction; and an alignment pin coupled with a first hinge member of the hinge, wherein the second coupling plate is coupled with a second hinge member of the hinge, and the first coupling plate is coupled with the first hinge member, such that the second coupling plate is configured to rotate about a second axis to adjust an orientation of the display unit in a second direction, the second axis perpendicular to the first axis, and wherein an end of the alignment pin is configured to engage a portion of the second hinge member of the hinge, the alignment pin being adjustable to set a position of the second hinge member and the second coupling plate relative to the first hinge member and the first coupling plate about the first axis.

2. The adjustment assembly of claim 1, wherein the adjustment assembly further comprises:

a drive apparatus coupled with both the first coupling plate and the second coupling plate, the drive apparatus configured to receive an input and cause a shaft to extend or retract to drive rotation of the second coupling plate about the first axis.

3. The adjustment assembly of claim 2, wherein the drive apparatus comprises a jack configured to receive the input as a manual torque input and drive extension of the shaft to cause the second coupling plate to rotate about the first axis.

4. The adjustment assembly of claim 1, wherein the second hinge member is fixedly coupled with the second coupling plate and the first hinge member is fixedly coupled with the first coupling plate, the first hinge member and the second hinge member pivotally coupled with each other at the first axis.

5. The adjustment assembly of claim 4, wherein the alignment pin is threadingly coupled with the first hinge member.

6. The adjustment assembly of claim 1, wherein the second coupling plate is transitionable between a plurality of angular positions about the second axis, the second coupling plate coupled with the second hinge member through a bearing, wherein the second coupling plate comprises a pin, the pin configured to be received within an opening of the second coupling plate and corresponding openings of the second hinge member to lock the second coupling plate at the plurality of angular positions about the second axis.

7. The adjustment assembly of claim 1, wherein the display unit is configured to be adjusted about the first axis across a span of 90 degrees and about the second axis across a span of 90 degrees.

8. The adjustment assembly of claim 1, wherein the adjustment assembly is capable of supporting a display unit having a weight over 200 pounds.

9. A display system, comprising:

a truss structure;

a display unit; and an adjustment assembly for the display unit, the adjustment assembly comprising:

a first coupling plate coupled with the truss structure;

a second coupling plate coupled with the display unit;

a hinge rotatably coupling the first coupling plate with the second coupling plate such that the second coupling plate is configured to rotate about a first axis to adjust an orientation of the display unit in a first direction; and an alignment pin coupled with a first hinge member of the hinge, wherein the second coupling plate is rotatably coupled with a second hinge member of the hinge, and the first coupling plate is coupled with the first hinge member, such that the second coupling plate is configured to rotate about a second axis to adjust an orientation of the display unit in a second direction, the second axis perpendicular to the first axis, and wherein an end of the alignment pin is configured to engage a portion of the second hinge member of the hinge, the alignment pin being adjustable to set a position of the second hinge member and the second coupling plate relative to the first hinge member and the first coupling plate about the first axis.

10. The display system of claim 9, wherein the adjustment assembly further comprises:

a drive apparatus coupled with both the first coupling plate and the second coupling plate, the drive member configured to receive an input and cause a shaft to extend or retract to drive rotation of the second coupling plate about the first axis.

11. The display system of claim 10, wherein the drive apparatus comprises a jack configured to receive the input torque as a manual torque input and drive extension of the shaft to cause the second coupling plate to rotate about the first axis.

12. The display system of claim 9, the second hinge member is fixedly coupled with the second coupling plate and the first hinge member is fixedly coupled with the first coupling plate, the first hinge member and the second hinge member pivotally coupled with each other at the first axis.

13. The display system of claim 12, wherein the alignment pin is threadingly coupled with the first hinge member.

14. The display system of claim 9, wherein the second coupling plate is transitionable between a plurality of angular positions about the second axis, the second coupling plate rotatably coupled with the second hinge member through a bearing, wherein the second coupling plate comprises a pin, the pin configured to be received within an opening of the second coupling plate and corresponding openings of the second hinge member to lock the second coupling plate at the plurality of angular positions about the second axis.

15. The display system of claim 9, wherein the display unit is configured to be adjusted about the first axis across a span of 90 degrees and about the second axis across a span of 90 degrees.

16. The display system of claim 9, wherein the adjustment assembly is capable of supporting a display unit having a weight of over 200 pounds.

17. A structural assembly, comprising:

a first coupling plate fixed to a truss structure;

a second coupling plate coupled with a display unit;

a hinge comprising a first hinge member coupled with the first coupling plate and a second hinge member coupled with the second coupling plate, the hinge defining a first axis about which the second coupling plate and the second hinge member are rotatable to re-orient the display unit about the first axis;

an alignment pin coupled with the first hinge member of the hinge;

a screw jack coupled with the first coupling plate and the second coupling plate, the screw jack configured to receive a user input and drive rotation of the second coupling plate and the second hinge member about the first axis;

wherein the second coupling plate is rotatably coupled with the second hinge member through a bearing such that the second coupling plate is configured to rotate relative to the second hinge member about a second axis, the second axis normal to the second hinge member and perpendicular with the first axis, and wherein an end of the alignment pin is configured to engage a portion of the second hinge member, the alignment pin being adjustable to set a position of the second hinge member and the second coupling plate relative to the first hinge member and the first coupling plate about the first axis.

18. The structural assembly of claim 17, wherein the second coupling plate is transitionable between a plurality of angular positions about the second axis, wherein the second coupling plate comprises a pin, the pin configured to be received within an opening of the second coupling plate and corresponding openings of the second hinge member to lock the second coupling plate at the plurality of angular positions about the second axis.

19. The structural assembly of claim 17, wherein the alignment pin is threadingly coupled with the first hinge member.

20. The structural assembly of claim 17, wherein the second coupling plate comprises a lever configured to be grasped by a user to facilitate rotation of the second coupling plate about the second axis relative to the second hinge member.

* * * * *